May 5, 1936.  D. O. DRUGE ET AL  2,039,638
AIR INFLATER MECHANISM
Filed Jan. 16, 1935
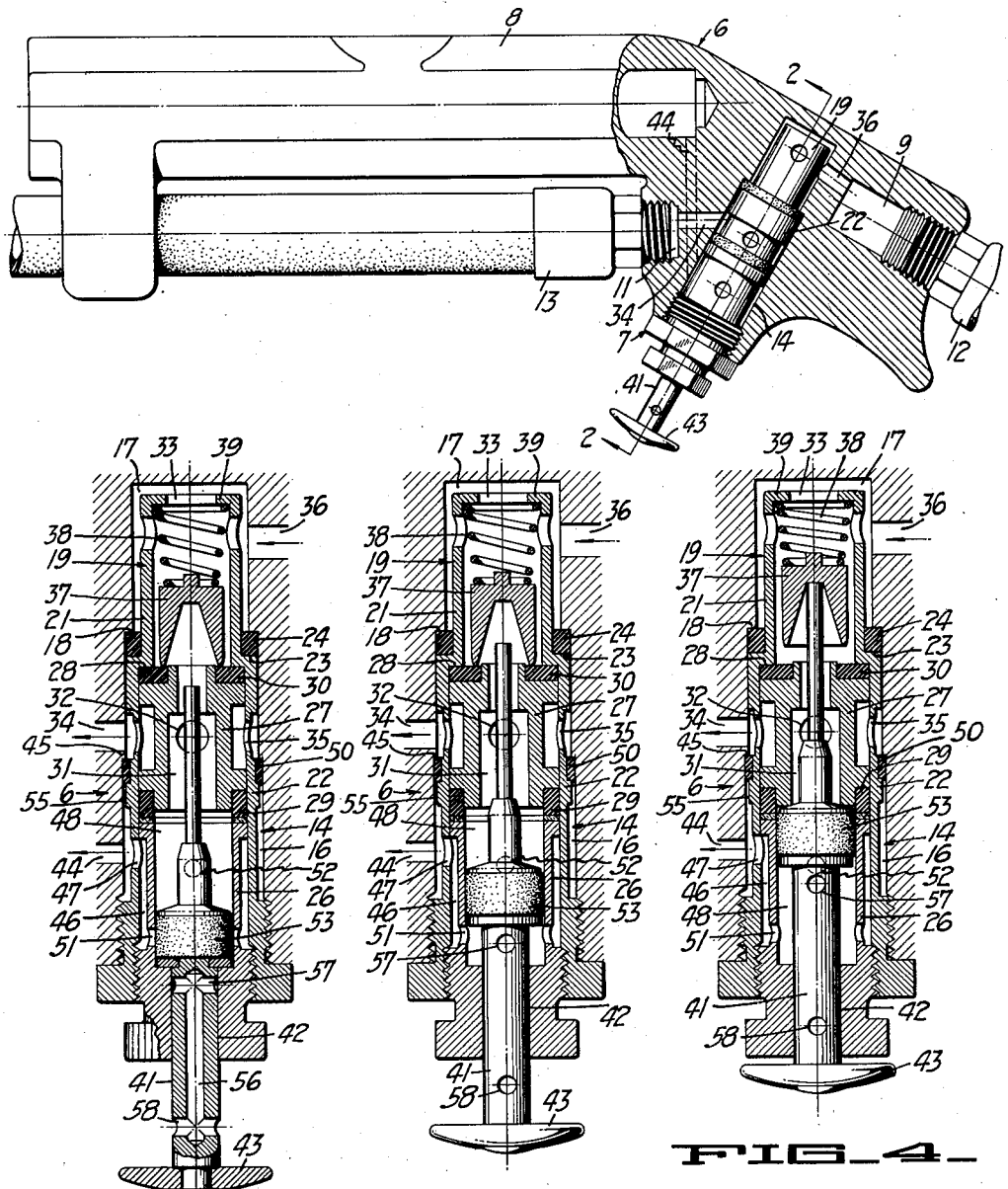
INVENTORS
Daniel O. Druge
Otto C. Druge
BY Joseph B. Gardner
their ATTORNEY.

Patented May 5, 1936

2,039,638

UNITED STATES PATENT OFFICE 2,039,638

AIR INFLATER MECHANISM

Daniel O. Druge and Otto C. Druge,
Oakland, Calif.

Application January 16, 1935, Serial No. 2,046

4 Claims. (Cl. 277—20)

The invention relates to equipment for inflating and determining the air pressure within pneumatic tires and other inflatable objects, and relates more particularly to the valve mechanism used in connection with said equipment and of the general type disclosed in our co-pending application 561,100.

Air inflater equipment of the type to which the present invention is related usually includes in a single body structure a pressure gauge and an air valve mechanism and is ordinarily carried by and is operatively connected to the outlet terminal of an air supply hose and has connected thereto a relatively short air hose which is arranged for connection to a tire vent or to the inlet of other objects to be inflated. Devices of this type have been widely used in gasoline service stations and garages where the same are in most instances subjected to exposure to all sorts of weather, frequently dragged over gravel or cement or other ground surfaces and otherwise subjected to extremely rough handling in their usage. As will be understood, while this extremely rough handling of the apparatus is sufficiently abusive on the body section of the device, the same involves an added strain on the valve mechanism, which notwithstanding any abuse is subjected in ordinary usage to the wearing out and loss of effectiveness of the moving and other parts thereof. The condition is further aggravated in the case of more recent developments in air inflater devices wherein the valve mechanism is of a rather intricate assembly of parts and serves in different positions thereof to not only inflate the tire and to afford a reading of the pressure of the tire, but also to permit of a deflation of the tire without removing or in any way rearranging the hose connection of the apparatus. As a result it is not infrequent that certain parts of the valve assembly will become worn, or that grit or dirt or other foreign particles will become lodged in portions of the valve mechanism or that other conditions will present themselves to cause the valve mechanism to leak or otherwise lose some of its effectiveness and to thereby make necessary the dismembering and cleaning and repairing of the valve assembly. When such disassembly of the valves and the repair thereof is effected either at the factory or by a repair man who has a complete knowledge and understanding of the valve, the same may be executed simply and expeditiously. However, the difficulty arises where the disassembly and repair of the mechanism is attempted by the service station attendant or other person who is unacquainted with the valve structure. In such cases, it almost invariably occurs that certain of the smaller parts of the valve assembly are either lost or broken or that other parts are wrongly associated in reassembling the device. In view of the foregoing, we have developed, and as an object of the present invention provide, a valve assembly of the character described which will have the parts thereof unitarily associated to permit removal of the valve mechanism as a unit from the body portion proper of the apparatus and to afford the ready and simple insertion of a new or repaired valve insert for use during the time the removed valve unit is returned to the factory or given to a skilled repair man for repair without substantially interrupting or interfering with the continuous use of the air inflater apparatus.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

Figure 1 is an elevational view of an air inflater apparatus constructed in accordance with our invention and with portions of the body thereof broken away and shown in section.

Figure 2 is a fragmentary sectional view of the valve mechanism of the inflater apparatus and is taken substantially on the plane of the line 2—2 of Figure 1.

Figures 3 and 4 are views similar to Figure 2 but show different positions of the valve mechanism.

As illustrated in the drawing, the device of our invention comprises a body 6 which contains the air control mechanism 7 and is formed with an elongated cylindrical portion 8 for housing a gauge mechanism of the type commonly used in this class of equipment. The body is also provided on the opposite sides thereof with threaded bore portions 9 and 11 for receiving the terminal fittings 12 and 13 of the air supply hose and tire connecting hose respectively. Preferably the general exterior shape of the body is of such form as may be readily gripped by the operator for control of the device with one hand while the other hand is utilized for holding the air filling hose to the tire intake opening.

Inclusion of the valve mechanism 7 in the body is afforded by the provision of a bore 14 formed in the body and opening to a side thereof and which comprises portions 16 and 17 respectively and conveniently termed an outer portion and an inner portion. The bore portion 16 is of larger diameter than the portion 17 so as to form at the contiguous ends of these portions and in the main bore 14 an annular shoulder 18. In the present arrangement the valve mechanism is arranged to be entirely enclosed by a shell 19 with which the valve parts are insertable and withdrawable from the body bore 14 as a unit. The shell 19 conforms in general with the shape of the bore having a reduced inner end 21 and an enlarged outer portion 22 and defined therebetween a shoulder 23 which is arranged to engage through the medium of a gasket 24 the bore shoulder 18 and is threaded adjacent the outer end for engagement with the adjacent bore side wall. The valve mechanism arranged to be enclosed within the shell 19 comprises a plug here shown formed of two parts 26 and 27, the latter part 27 being disposed inwardly from the part 26 and held in position against the inner end wall 28 of the shell portion 22 by means of the part 26 which has a screw threaded engagement with the shell. Preferably the opposite ends of the plug part 27 are provided with gaskets 29 and 30 whereby an air tight joint may be had between the parts and the wall 28. Formed in the plug part 27 is a passage 31 and branches 32 which communicate with the inner bore portion 17 through openings 33 provided in the inner shell portion 21 and with a passage 34 through shell openings 35 which passage leads to the discharge bore 11, the bore portion 17 it being noted is in direct communication with an inlet passage 36 which leads to the hose receiving bore 9 aforesaid.

Closing of communication between the passages 36 and 31 is arranged to be effected by means of a valve 37 which is designed to seat on the gasket 30, a spring 38 mounted against the inner end wall 39 of the shell serving to resiliently retain the valve in closed position. Displacement of the valve 37 for opening the passage 31 thereby permitting the air under pressure to be forced into the tire, may be effected by means of a stem 41 which extends completely through the plug and is conveniently disposed in the passage 31. The outer end portion of the stem slidably fits in a bearing 42 formed in the outer end portion of the plug while the inner end of the stem is arranged to contact with the valve. Movement of the stem against the action of the spring 38 and the pressure of the air in the passage 36 may be accomplished by pressing inwardly on a button 43 on the outer extremity of the stem. Communication of the gauge mechanism with the discharge passage 34 for enabling the reading of the air pressure in the tire or other object being inflated is arranged to be effected in part by a passage 44 which extends from a gauge mechanism contained in the body portion 8 to the outer portion 16 of the bore adjacent to but at the outer side of the discharge passage 34. Such communication, however, is arranged to be effected only through the shell passages and is prevented at the exterior of the shell by a packing washer 50 which is confined between opposed shoulders 45 and 55 on the bore and shell respectively. The plug section 26 is reduced about its middle portion so as to provide within the shell an annular space 46 which communicates with the passage 44 through openings 47 in the shell, and said section is formed on the interior with a cylindrical bore 48 which to some extent forms a continuation of the passage 31 and communicates with the space 46 by means of spaced ports 51 and 52 operatively engaging the wall of the bore 48 and fixedly secured to the stem 41 is a piston 53 which is arranged in the different positions of the stem to cover the ports 51 and 52.

When, as shown in Figures 3 and 4, the piston 53 is below the port 52, air may pass from the passage 31 through said port to the passage 44, and on the other hand when the piston is above said port, as shown in Figure 4, communication between the passages 31 and 44 is cut off. Formed in the portion of the stem between the piston and the button 43 is a longitudinally extending passage 56 conveniently termed a deflating passage and having its inlet and outlet points 57 and 58 adjacent the extremities of such stem portion. When the piston, as shown in Figure 3, is above the port 51, the gauge passage 44 or the passage 31 may be in communication with the outlet or deflating passage 56 thereby making it possible to discharge through the latter any excess pressure in the gauge or tire.

In the operation of our device, assuming that the latter is operatively connected by way of the passage 36 to a source of air under pressure, and connected through the passage 34 to a pneumatic tire to effect inflation of the tire, the operating button 43 is depressed to an extreme inward position as indicated in Figure 4. As a result of this positioning, the stem 41 will have raised the valve 37 off its seat whereby air from the passage 36 may by way of passage 31 and branches 32 enter the air passage 34 for direct transmission to the tire, it being noted that with the valve 37 held off its seat by the stem, the piston 53 will have been raised to a position cutting off communication between passage 31 and the gauge passage 44 or deflating passage 56 through either of the ports 51 and 52. It will thus be seen that as long as the button 43 is held depressed to effect deflation of the tire, the air may be directed to the gauge mechanism or permitted to escape through the deflating means. Should it now, or in fact at any time, be desirable to measure the pressure in the tire the button is released whereby the stem may assume its extreme outward position as shown in Figure 2. With the stem thus positioned the valve 33 will have returned to its seat and the piston 53 moved below the port 52 and opposite port 51 whereby discharge of air to the deflating passage is still prevented, but air from the passage 34 may back up into the gauge passage 44 by way of passage 31 and port 52. Should it at any time become desirable to deflate the tire, it is merely necessary to maintain the tire in open communication with the passage 34 so that the air in the tire will back up into the passage 31 and then depress the button about half way so that the piston 53 will lie between the ports 51 and 52 as shown in Figure 3. With the piston thus disposed air from passage 14 may pass into passage 31 and thence into port 52 and out of port 51 to finally discharge in the atmosphere through the deflation passage 56.

It will now be clear that we have in the present invention provided for a valve mechanism wherein by a simple and selective movement of the valve stem an inflation gauging or deflation of a tire may be effected without requiring the removal or any rearranging of the inflater hose connection, and wherein said valve mechanism is incorporated by means of the shell 19 into a single unitary structure which may be readily inserted or removed as a unit from the inflater casing for cleaning, inspection or repair without making likely the losing or breaking of small valve parts, or involving the risk in the reinsertion of the mechanism as a unit of a wrong association of any of the parts.

In order that the attendant in charge of the use of the apparatus may, in the event of breakage or other reason prompting the disassembly of the valve mechanism, be caused to remove the shell from the body portion and as a result withdraw the valve mechanism as a unit rather than loosen the tire plug portion 26, this latter portion may, as shown in Figure 2, be rounded at the outer side thereof in contrast to the polygonal shape of the shell exterior so that the removal of the plug section 26 would be difficult except with the use of a pipe wrench or the like, and the attention of the operator would be naturally directed to the easier gripping exterior of the shell. Thus in the case of repair of the apparatus, the removal of the shell and the valve mechanism as a unit will be obvious and a new or rebuilt valve insert may be quickly and readily substituted for the removed one so as to not interrupt the service of the apparatus during the repair of the removed valve unit.

We claim:

1. An inflater mechanism comprising, a casing having a bore opening to a side thereof and formed with a shoulder intermediate the ends of the bore, a passageway arranged for connection to a source of air under pressure and opening to said bore at the inner side of said shoulder, a pair of passageways arranged for connection to a tire and a gauge respectively and opening to said bore at spaced points at the outer side of said shoulder, a shell inserted in said bore and formed with a pair of shoulders, packing rings fitting about said shell and against said shoulders and arranged to engage said bore shoulder and the sides of the bore intermediate said last named passageways to seal said passageways one from the other, and a valve mechanism enclosed within said shell and removable therewith as a unit from said bore and arranged to selectively connect said tire passageway to said source passageway or to said gauge passageway.

2. An air inflater mechanism comprising, a casing formed with a bore opening to a side thereof and provided with air supply, discharge and gauge passages opening to said bore adjacent the inner end and at the sides thereof respectively, a shell mounted in said bore and threadably secured to said casing at the outer end thereof and engaging with the walls of said bore to seal said passages from each other at the outer side of the shell and provided with openings communicating with said passages, a hollow plug threadably carried in said shell and engaging the sidewalls thereof to seal the shell openings from each other and provided with an air control passage in communication with said supply passage and a piston bore in alignment and registration with said control passage, a valve engaging the inner end of said plug and normally closing said control passage and interposed between the latter and said supply passage, a spring supported at the inner end of said shell and engaging and urging said valve against said plug, said plug being reduced about its periphery opposite said shell openings communicating with said discharge and gauge passages to provide passageways thereat and having ports one opening from the passageway opposite said discharge opening to said control passage and a pair of ports opening from said other passageway to spaced points to said piston bore, a piston mounted in said piston bore and movable to cover and uncover said last named ports, a stem mounted on said piston and extending through said control passage to engage and unseat said valve, and a hollow shaft secured to said piston and extending without said plug for moving said piston and being open adjacent its ends to said piston bore and the atmosphere respectively.

3. An inflater mechanism comprising, a casing provided with a valve chamber and having passages opening thereto and arranged for connection with a source of air pressure and a tire or other object to be inflated, a shell mounted in said chamber and sealing said passages from each other at the outer side of said shell and having openings communicating with said passages, and a valve mechanism mounted in said shell and arranged to stop and permit flow of air through said passages and being arranged in said shell for removal therewith as a unit from said chamber, said valve mechanism comprising in part and being retained in said shell by a plug threaded to said shell and providing an engageable portion at the exterior of said shell for enabling its removal, said engageable portion having a cylindrical exterior so as to normally indicate the removal of said shell from said chamber rather than the plug from said shell.

4. An inflater mechanism comprising, a casing having a bore opening to a side thereof and formed with spaced shoulders intermediate the ends of the bore, passageways opening to said bore at the inner side of the inner shoulder and between said shoulders and at the outer side of the outer shoulder and arranged for connection to a source of air under pressure and a tire and a gauge respectively, a shell inserted in said bore and formed with a pair of shoulders, packing rings fitting about said shell and against said shoulders and arranged to engage said bore shoulders to seal said passageways one from the other, and a valve mechanism enclosed within said shell and removable therewith as a unit from said bore and arranged to selectively connect said tire passageway to said source passageway or to said gauge passageway.

DANIEL O. DRUGE.
OTTO C. DRUGE.